US010489042B2

(12) United States Patent
Nishio (10) Patent No.: US 10,489,042 B2
(45) Date of Patent: Nov. 26, 2019

(54) DISPLAY DEVICE AND COMPUTER-READABLE NON-TRANSITORY RECORDING MEDIUM WITH DISPLAY CONTROL PROGRAM STORED THEREON

(71) Applicant: KYOCERA Document Solutions Inc., Osaka (JP)

(72) Inventor: Ken Nishio, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 6 days.

(21) Appl. No.: 16/021,549

(22) Filed: Jun. 28, 2018

(65) Prior Publication Data

US 2019/0025997 A1 Jan. 24, 2019

(30) Foreign Application Priority Data

Jul. 19, 2017 (JP) ................. 2017-140329

(51) Int. Cl.

| G06F 3/0485 | (2013.01) |
| G06F 3/041 | (2006.01) |
| G06F 3/045 | (2006.01) |
| G06F 3/044 | (2006.01) |
| G09G 5/34 | (2006.01) |
| G06F 3/14 | (2006.01) |

(52) U.S. Cl.
CPC ............ *G06F 3/0485* (2013.01); *G06F 3/044* (2013.01); *G06F 3/045* (2013.01); *G06F 3/0412* (2013.01); *G06F 3/14* (2013.01); *G09G 5/34* (2013.01)

(58) Field of Classification Search
None
See application file for complete search history.

(56) References Cited

U.S. PATENT DOCUMENTS 8,196,061 B1 * 6/2012 Bhojan ................ G06F 3/0483
715/787

FOREIGN PATENT DOCUMENTS

JP H09-325879 A 12/1997

* cited by examiner

*Primary Examiner* — Chad M Dicke
(74) *Attorney, Agent, or Firm* — IP Business Solutions, LLC (57) ABSTRACT

A display device includes a display unit, a touch panel, a storage unit, and a control section that: allows the storage unit to store a display position of content being displayed on a screen of the display unit at a start time point of scroll display, and allows the display unit to display a return mark through which a return to the display position is instructed; when a touch gesture on the return mark is detected through the touch panel before the scroll display is ended, reads out the display position from the storage unit and allows the display unit to redisplay the content of the display position; and when the scroll display is ended without the touch gesture on the return mark being detected through the touch panel, maintains a display state of the content being displayed on the screen of the display unit at the end time point.

7 Claims, 5 Drawing Sheets

Fig.5B ically the entire page.

DISPLAY DEVICE AND COMPUTER-READABLE NON-TRANSITORY RECORDING MEDIUM WITH DISPLAY CONTROL PROGRAM STORED THEREON

INCORPORATION BY REFERENCE

This application claims priority to Japanese Patent Application No. 2017-140329 filed on Jul. 19, 2017, the entire contents of which are incorporated by reference herein.

BACKGROUND

The present disclosure relates to display devices and computer-readable non-transitory recording media with display control programs recorded thereon and particularly relates to a technique of scroll displaying content on a screen of a display unit.

A mobile terminal device such as a smartphone (one example of the display device) includes a touch panel disposed at a screen of a display unit, accepts a user's gesture (a touch gesture and the like) performed on the screen of the display unit through the touch panel, and performs a response operation with respect to the user's gesture. For example, there is a technique in which when a user performs a certain gesture on a scroll handle of a scroll bar displayed on a window screen, a marker serving as a bookmark is displayed at a display position of the scroll handle, and when the user performs a certain gesture on the marker, the window screen is moved to the position of the marker. Redisplaying of the window screen having been displayed immediately before the start of the scroll display is enabled by such technique.

SUMMARY

A technique improved over the above technique is proposed herein as an aspect of the present disclosure.

A display device according to an aspect of the present disclosure includes a display unit, a touch panel, a storage unit, and a control section. The touch panel is disposed at a screen of the display unit. The control section allows the display unit to display content on the screen and, when the touch panel detects a scroll gesture, allows the display unit to perform, on the screen, scroll display of the content. The control section allows the storage unit to store a prior display position of the content being displayed on the screen of the display unit at a start time point of the scroll display, and allows the display unit to display, on a predetermined position at the screen, a return mark through which a return to the prior display position is instructed. When a touch gesture on the return mark is detected through the touch panel before the scroll display is ended and then the scroll display is ended, the control section reads out the prior display position from the storage unit and allows the display unit to redisplay on the screen the content of the prior display position, and when the scroll display is ended without the touch gesture on the return mark being detected through the touch panel, the control section maintains a display state of the content being displayed on the screen of the display unit at the end time point.

Another aspect of the present disclosure is a computer-readable non-transitory recording medium with a display control program recorded thereon. The display control program allows a computer including a processor to function, when the processor executes the display control program, as a control section. The control section allows a display unit to display content on a screen thereof and, when a touch panel disposed at the screen of the display unit detects a scroll gesture, allows the display unit to perform, on the screen, scroll display of the content. The display control program further causes the computer to function so that the control section: allows the storage unit to store a prior display position of the content being displayed on the screen of the display unit at a start time point of the scroll display, and allows the display unit to display, on a predetermined position at the screen, a return mark through which a return to the prior display position is instructed; when a touch gesture on the return mark is detected through the touch panel before the scroll display is ended and then the scroll display is ended, reads out the prior display position from the storage unit and allows the display unit to redisplay on the screen the content of the prior display position; and when the scroll display is ended without the touch gesture on the return mark being detected through the touch panel, maintains a display state of the content being displayed on the screen of the display unit at the end time point.

DETAILED DESCRIPTION

Hereinafter, a description will be given of a display device and a display control program according to one embodiment of the present disclosure with reference to the drawings.

Figure 1:
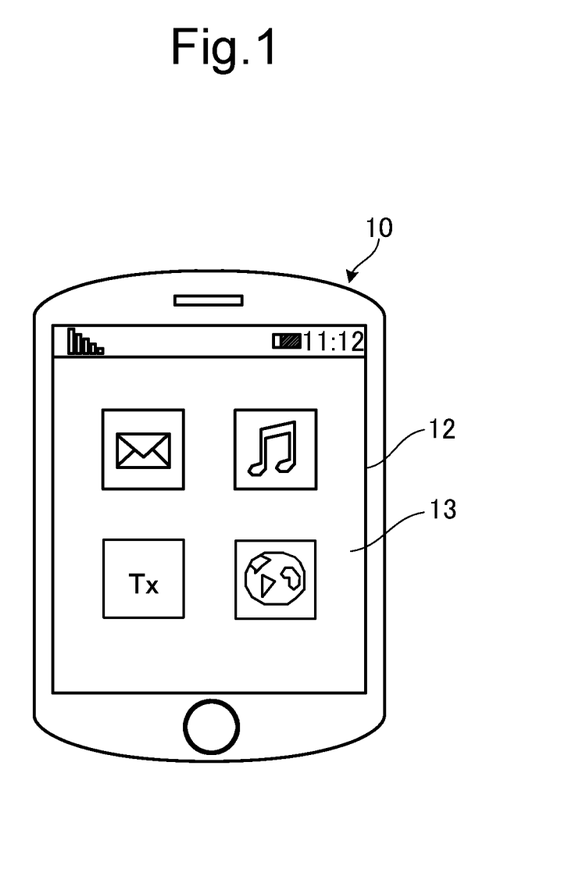
FIG. 1 is a perspective view showing an appearance of a display device according to one embodiment of the present disclosure.
Figure 2:
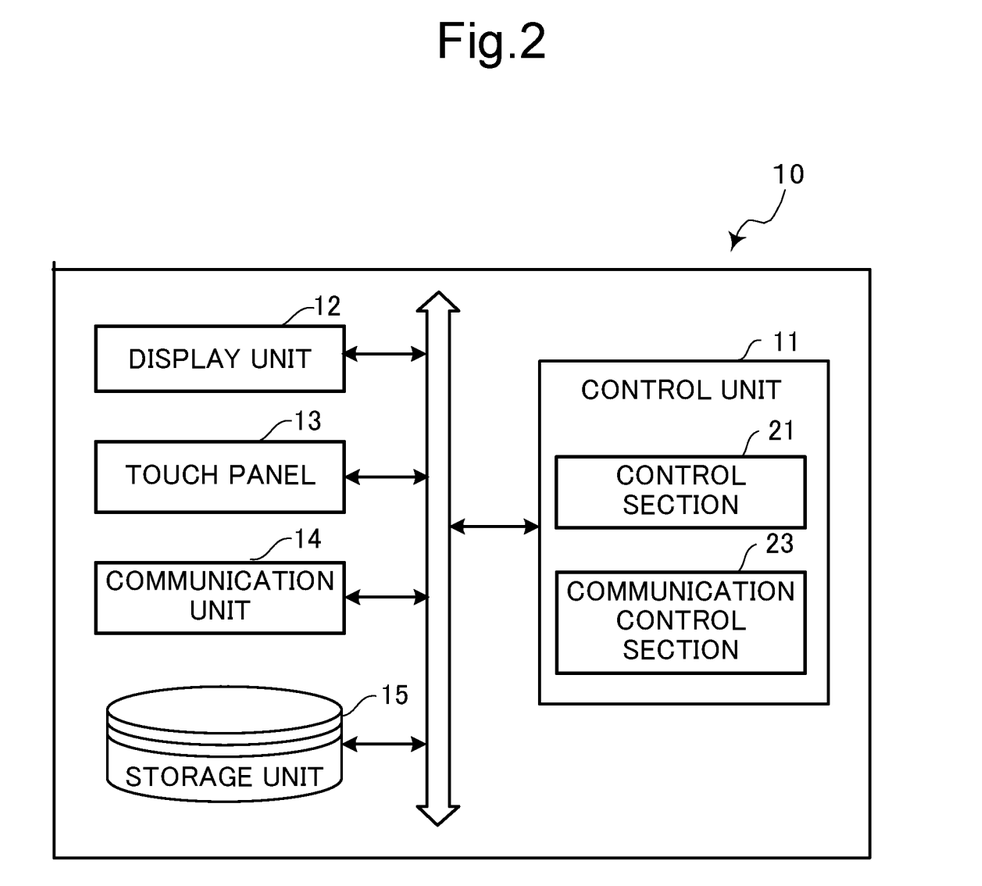
FIG. 2 is a block diagram showing an internal configuration of the display device according to the one embodiment.

FIG. 1 is a perspective view showing an appearance of the display device according to one embodiment of the present disclosure. FIG. 2 is a block diagram showing an internal configuration of the display device according to the one embodiment.

A display device 10 according to the one embodiment of the present disclosure is, for example, a mobile terminal device such as a smartphone, and includes a display unit 12, a touch panel 13, a communication unit 14, a storage unit 15, and a control unit 11. These components can transfer data or signals to and from one another via a bus.

The display unit 12 is formed of a liquid crystal display (LCD), an organic light-emitting diode (OLED) or the like.

The touch panel 13 is of a resistive film type or an electrostatic capacitance type. The touch panel 13 is disposed at a screen of the display unit 12, and detects contact made on the screen of the display unit 12 by, for example, a finger, as well as a position where the contact is made. Upon detecting the contact made by, for example, the finger, the touch panel 13 outputs a detection signal indicating a coordinate of the contact position, to a control section 21 of the control unit 11. Thus, the touch panel 13 serves as an operation unit through which a user's gesture performed on the screen of the display unit 12 is entered.

The display device 10 also may include hard keys that serve as an operation panel through which a user's gesture is entered, in addition to the touch panel 13.

The communication unit 14 is a communication interface including a communication module having a non-illustrated local area network (LAN) chip.

The storage unit 15 includes a large-capacity solid state drive (SSD) or a hard disk drive (HDD), and stores various data and programs.

The control unit 11 is constituted of a processor, a random-access memory (RAM), a read-only memory (ROM), and so forth. The processor may be, for example, a central processing unit (CPU), an MPU, or an ASIC. The control unit 11 acts as the control section 21 and a communication control section 23 when the processor executes a display control program stored in the ROM or the storage unit 15. Here, the components of the control unit 11 may each be constituted in the form of a hardware circuit, instead of being performed according to the display control program.

The control section 21 serves to control the overall operation of the display device 10. The control section 21 is connected to the display unit 12, the touch panel 13, the communication unit 14, and the storage unit 15, so as to control operation of each of these elements and exchange signals or data therewith. The control section 21 especially controls display operation of the display unit 12. The communication control section 23 has a function of controlling the communication operation of the communication unit 14.

The control section 21 identifies a user's gesture entered by the user, based on the detection signal output from the touch panel 13. The control section 21 then performs control corresponding to the identified user's gesture.

Examples of the user's gesture are a touch gesture, a swipe gesture, and a scroll gesture. For example, when the user touches the touch panel 13 by his or her finger and then withdraws the finger from the touched position right away, the touch panel 13 outputs the detection signal indicating the position where the contact has been detected, to the control section 21. Upon receipt of the detection signal, the control section 21 determines, based on the detection signal, that the user's gesture is a touch gesture. The touch gesture is performed, for example, on a soft key on the screen of the display unit 12.

When the user touches the touch panel 13 by the finger and then moves the finger while maintaining the contact therewith, the touch panel 13 outputs the detection signal indicating the locus of the finger between the initial position where the contact has been detected first and the final position where the contact has been detected last, to the control section 21. Upon receipt of the detection signal, the control section 21 determines, based on the detection signal, that the user's gesture is a swipe gesture and which direction the swipe gesture has been performed. The swipe gesture is performed, for example, on an icon displayed on the screen of the display unit 12 when moving the icon.

When the user quickly moves the finger simultaneously with touching the touch panel 13 with the finger and then removes the finger from the touch panel 13 (in other words when the user performs a gesture of flicking the touch panel 13 by the finger), the touch panel 13 outputs the detection signal indicating the locus of the finger between the initial position where the contact has been detected first and the final position where the contact has been detected last, to the control section 21. Upon receipt of the detection signal, the control section 21 detects, based on the detection signal, changes made quickly during a short period of time on the contact positions, and determines that the user's operation is a scroll gesture (also referred to as a flick gesture) and which direction the scroll gesture has been performed. In the present embodiment, when, for example, inertial scroll display is performed on content such as documents and images displayed on the screen of the display unit 12, the scroll gesture is performed on the screen. The inertial scroll display is display of a screen-movement that causes the display of the screen-movement to be looked as if inertia is acted thereon; for example, in the inertial scroll display, a moving speed of the content on the screen of the display unit 12 is the fastest at the start time point of the inertial scroll display and is gradually lowered with the lapse of time from the start time point of the inertial scroll display and finally becomes "0".

After the inertial scroll display is performed on the content such as documents and images displayed on the screen of the display unit 12, there are some cases where the user wants to check contents of the content having been displayed immediately before a start of the inertial scroll display. A gesture for such checking is desirable to be simple.

The present embodiment allows the display unit 12 to redisplay, on the screen, contents of the content having been displayed immediately before the start of the inertial scroll display through the simple gesture on the touch panel 13, thereby enabling the user to perform the checking.

Figure 3:
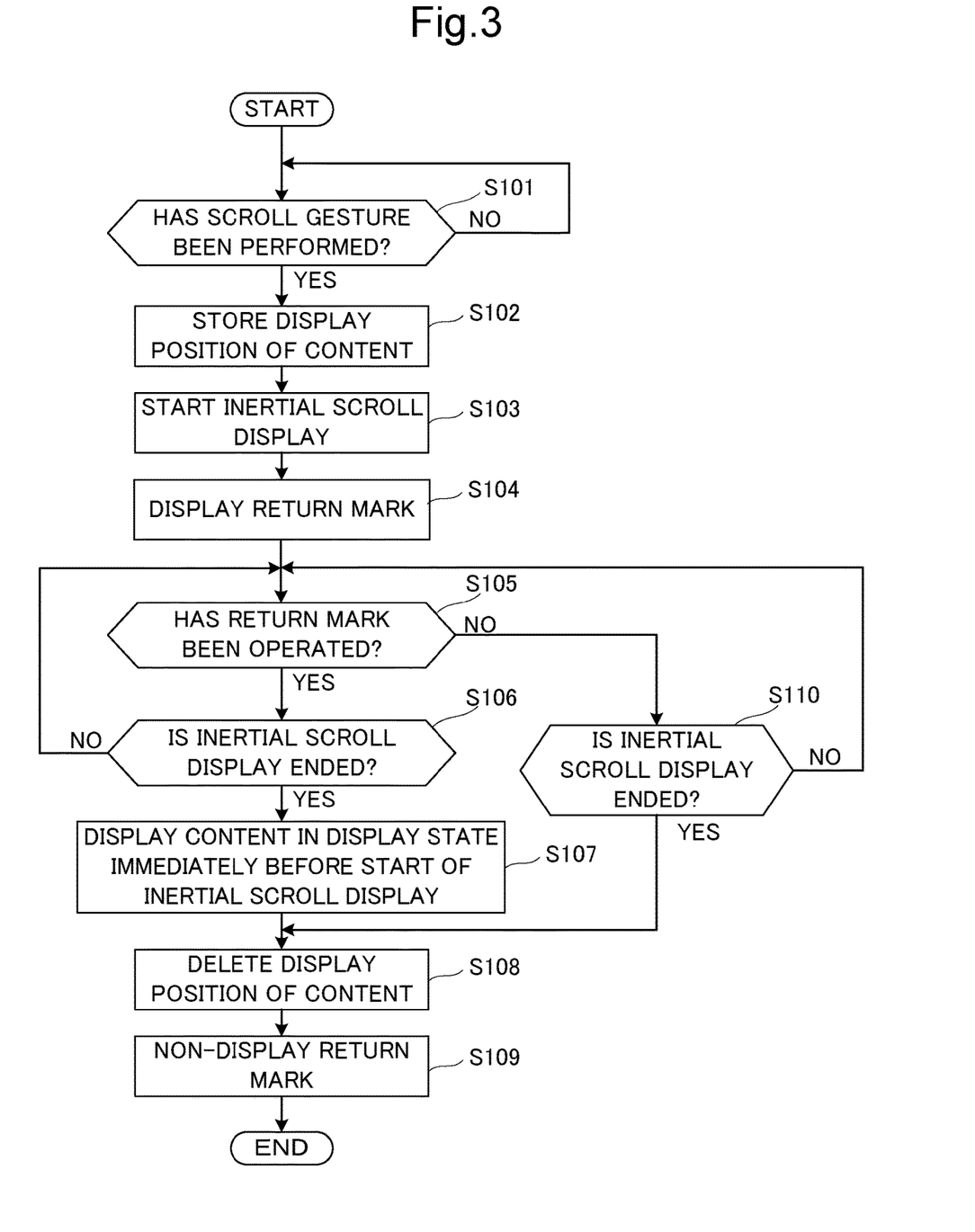
FIG. 3 is a flowchart showing a processing procedure of performing inertial scroll display on content displayed on a screen of a display unit provided at the display device and of redisplaying, on the screen of display unit, contents of the content having been displayed immediately before a start of the inertial scroll display.

Hereunder, a description will be given of processing of the display device 10 according to the present embodiment with reference to the drawing such as a flowchart shown in FIG. 3; the processing is for allowing the display unit 12 to perform the inertial scroll display on the content displayed on the screen in response to the user's gesture on the touch panel 13 and allowing the display unit 12 to redisplay, on the screen, contents of the content having been displayed immediately before the start of the inertial scroll display.

Figure 4:
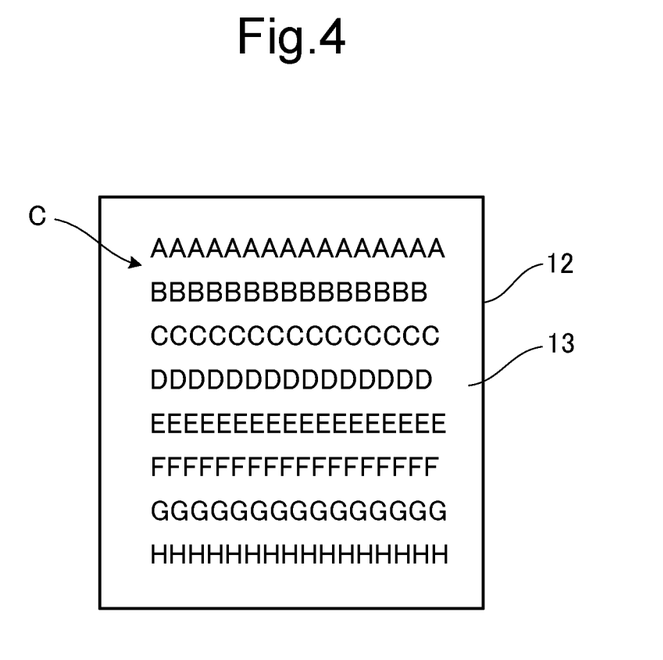
FIG. 4 is a diagram showing an example of the content displayed on the screen of the display unit provided at the display device.

First of all, in the display device 10, during a state of allowing the display unit 12 to display content C such as documents and images an example of which is as shown in FIG. 4, the control section 21 waits for the scroll gesture to be performed on the touch panel 13 by the user ("NO" in S101).

When the user performs the scroll gesture on the touch panel 13, based on the detection signal output from the touch panel 13, the control section 21 determines that the performed gesture is the scroll gesture (the flick gesture). The control section 21 also determines, as the operating direction of the scroll gesture, whether the scroll gesture has been performed in the upward direction or downward direction ("YES" in S101), obtains a display position CP (a prior display position before the start of the scroll display) of the content C on the screen of the display section 12 at a time of the determination, and allows the storage unit 15 to store the display position of the content C (S102).

Figure 5A:
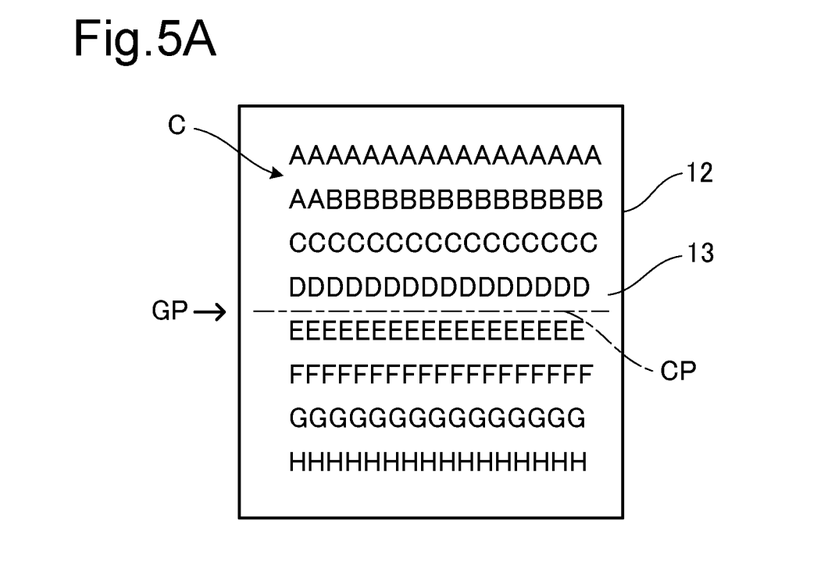
FIG. 5A is a diagram showing an example of the content having been displayed on the screen of display unit immediately before the inertial scroll display is started.

For example, as shown in FIG. 5A, the control section 21 allows the storage unit 15 to store, as the display position of the content C, the display position CP of the content C that coincides with a center position GP in the vertical direction on the screen displayed on the display unit 12 at the time of the above determination.

The control section 21 then starts performing, on the screen of the display unit 12, the inertial scroll display of the content C toward the direction determined by the control section 21 while appropriately reading out the content C stored in the storage unit 15 beforehand (S103).

Under the display control by the control section 21, by the inertial scroll display, the content C is scroll-displayed in the upward direction or downward direction on the screen of the display unit 12 and the moving speed of the content C is the fastest at the start time point of the inertial scroll display and is gradually lowered with the lapse of time from the start time point of the inertial scroll display and finally becomes "0".

If the scroll gesture is performed on the touch panel 13 again or repeatedly in the middle of the inertial scroll display, the control section 21 performs again or performs repeatedly the inertial scroll display to thereby continue the inertial scroll display, and further performs switching of upward direction or downward direction of the inertial scroll display in accordance with change in the direction of the scroll gesture. In addition, a period until the inertial scroll is stopped and the moving speed during this period, both of which are controlled by the control section 21, are set in such lengths and slowness that the user can see the content C.

Figure 5B:
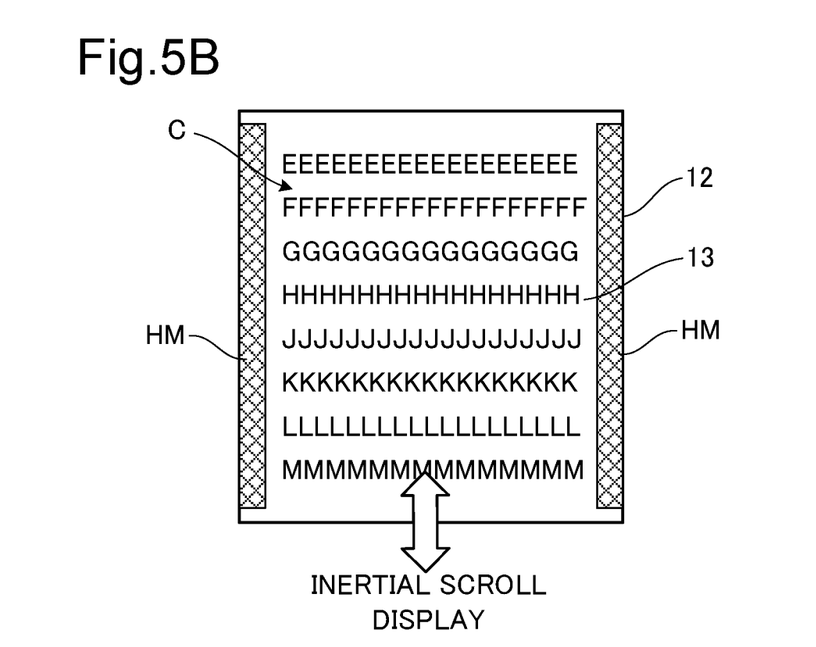
FIG. 5B is a diagram showing an example of the content displayed on the screen of display unit during the inertial scroll display.

As shown in FIG. 5B, the control section 21 allows the display unit 12 to display a belt-shaped return mark HM at a predetermined position on the screen, for example each of the both sides of the screen (S104). The return mark HM is of a belt like shape extending toward the same direction as the arrow representing the direction of the inertial scroll display shown in FIG. 5B, and is easily operable compared to for example a small return mark displayed at a corner of the screen. The control section 21 allows the display unit 12 to display the return mark HM at a position on the screen where the content C does not overlap, the position being, for example, each of the both sides of the screen or one of the sides. Alternatively, the control section 21 may be arranged so as to display the return mark HM to overlap on the content C and to semi-transparently display the return mark HM so that the content C can be visually recognized.

As described above, the control section 21 determines whether the touch gesture on the return mark HM is detected through the touch panel 13 while continuously performing the inertial scroll display of the content C on the screen of the display unit 12 (S105) and determines whether the inertial scroll display is ended (S106).

Here, when an ending time of the inertial scroll display comes, the control section 21 stops the inertial scroll display and also determines that the inertial scroll display is ended ("YES" in S106).

Additionally, when the user wants to stop the inertial scroll display, the user performs the touch gesture on a portion different from where the return mark HM is displayed on the display unit 12. Upon receiving at this point, from the touch panel 13, the detection signal indicating that the touch gesture is performed on the aforesaid different portion (i.e., the portion different from where the return mark HM is displayed within the display area of the content C), the control section 21 determines that the inertial scroll display has been instructed to end, stops the inertial scroll display, and determines that the inertial scroll display is ended ("YES" in S106).

Therefore, when the ending time of the inertial scroll display comes, and also when stopping the inertial scroll display in response to the touch gesture performed on the portion different from where the return mark HM is displayed, the control section 21 determines that the inertial scroll display is ended ("YES" in S106).

When determining that the touch gesture on the return mark HM is detected through the touch panel 13 ("YES" in S105) and determining that the inertial scroll display is ended ("YES" in S106), the control section 21 reads out the display position CP, which has been obtained in step S102, of the content C on the screen of the display section 12 from the storage unit 15. As shown in FIG. 5A, the control section 21 allows the display unit 12 to display the content C on the screen such that the display position CP of the content C coincides with the center position GP in the vertical direction (S107), and restores the display state of displaying the content C having been displayed immediately before the start of the inertial scroll display (allows the display unit 12 to display the content C at the prior display position where the content C has been displayed before the start of the inertial scroll display).

Then the control section 21 deletes the display position CP of the content C from the storage unit 15 (S108) and non-displays the belt-shaped return mark HM displayed at the both sides of the screen of the display unit 12 (S109).

Accordingly, when the user performs a touch gesture on the return mark HM, the display state of displaying the content C having been displayed immediately before the start of the inertial scroll display is restored when the inertial scroll display is ended.

Alternatively, when the user performs a touch gesture on the portion different from where the return mark HM is displayed after performing a touch gesture on the return mark HM, the inertial scroll display is stopped at once and the display state of displaying the content C having been displayed immediately before the start of the inertial scroll display is restored.

In addition, also when a touch gesture is performed on the portion different from where the return mark HM is displayed, then a swipe gesture is performed from the aforesaid different portion to where the return mark HM is displayed and the swipe gesture is detected through the touch panel 13, the control section 21 may be arranged such that: detecting, through the touch panel 13, the touch gesture on the return mark HM and the touch gesture performed on the aforesaid different portion; determining that the touch gesture on the return mark HM is detected ("YES" in S105) and determining that the inertial scroll display is ended ("YES" in S106); reading out the display position CP of the content C from the storage unit 15; and allowing the screen of the display unit 12 to be restored to the display state of displaying the content C having been displayed immediately before the start of the inertial scroll display (S107). Then, the control section 21 deletes the display position CP of the content C from the storage unit 15 (S108), and non-displays the belt-shaped return mark HM displayed at the both sides of the screen of the display unit 12 (S109).

Then, when determining that the inertial scroll display is ended ("YES" in S110) without determining that the touch gesture on the return mark HM is detected through the touch panel 13 ("NO" in S105), the control section 21 deletes the display position CP, which has been obtained in step S102, of the content C on the screen of the display section 12, from the storage unit 15 (S108) while maintaining the display state of displaying the content C on the screen of the display section 12 at the ending time point, and non-displays the belt-shaped return mark HM displayed at the both sides of the screen of the display unit 12 (S109).

Therefore, if the user does not perform the touch gesture on the return mark HM, the display state of displaying the content C at the ending time point of the inertial scroll display is maintained. Alternatively, if the user performs the touch gesture on the portion different from where the return mark HM is displayed without performing the touch gesture on the return mark HM, the inertial scroll display is stopped at once and the display state of the content C at the time of this stopping is maintained.

In the present embodiment, as described thus far, when the scroll gesture is performed on the touch panel 13, the inertial scroll display is started on the screen of the display unit 12, the return mark HM is displayed on the screen of the display unit 12, and when the touch gesture is performed on the return mark HM, at the end of the inertial scroll display, the screen of the display unit 12 is restored to the display state of displaying the content C having been displayed immediately before the start of the inertial scroll display. Therefore, contents of the content C having been displayed immediately before the start of the inertial scroll display is redisplayed on the screen of the display unit 12 through the simple gesture, and the user can perform the checking thereon.

In the technique described in BACKGROUND, two kinds of gestures, which are a gesture performed on the scroll handle and a gesture performed on the marker, are required in order to redisplay the window screen that has been displayed immediately before the start of the scroll display. For this reason, in the case of frequently checking the contents of the content having been displayed immediately before a start of the inertial scroll display while repeatedly scroll displaying the contents such as documents and images on the screen of the display unit, the two gestures must be performed each time and the operation becomes complicated.

On the other hand, in the present embodiment, when the scroll display is being performed on the screen of the display unit, the screen immediately before the start of the scroll display can be recalled by a simple operation.

Furthermore, in the present embodiment, when the touch gesture on the return mark HM is detected through the touch panel 13 and the inertial scroll display is ended, the control section 21 controls the display operation of the display unit 12 so as to restore the display state of displaying the content C having been displayed immediately before the start of the inertial scroll display. Alternatively, the control section 21 may be arranged so that when detecting, through the touch panel 13, that the touch gesture is continuously performed on the return mark HM for a predetermined period (such as one second) and then the touch gesture is ended, the contents of the content C having been displayed on the screen of the display unit 12 immediately before the start of the inertial scroll display is redisplayed, even before the inertial scroll display is ended.

The display method using the display device 10 described in the above embodiment can be provided as a program. The program may be recorded on a computer-readable non-transitory recording medium, such as a hard disk, a CD-ROM, a DVD-ROM or a semiconductor memory. In this case, the computer-readable non-transitory recording medium with the program recorded thereon is one embodiment of the present disclosure.

Furthermore, although the above embodiment has been given taking the case of performing the scroll gesture in the vertical direction with respect to the screen (the content C) displayed on the display unit 12 as an example, the scroll gesture may be performed in in the left direction or the right direction. In such the case, the return mark HM may be displayed on the screen of the display unit 12 at both ends of upper end portion and lower end portion, or one of the ends thereof.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A display device comprising:
   a display unit;
   a touch panel disposed at a screen of the display unit;
   a storage unit;
   and a control section that allows the display unit to display content on the screen and, when the touch panel detects a scroll gesture, allows the display unit to perform, on the screen, an inertial scroll display of the content,
   wherein the control section:
   allows the storage unit to store a prior display position of the content being displayed on the screen of the display unit at a start time point when a user provides a scroll gesture to the inertial scroll display, and causes the display unit to display, on a predetermined position at the screen, a return mark through which a return function to the prior display position is provided to be operated by a user touch gesture;
   when a user touch gesture on the return mark is detected through the touch panel before the inertial scroll display of content has ended, the control section reads out the prior display position from the storage unit and allows the display unit to redisplay on the screen the content of the prior display position after the inertial scroll display of the content has ended;
   and when the inertial scroll display is ended without the user touch gesture on the return mark being detected through the touch panel, the control section maintains a display state of the content being displayed on the screen of the display unit at the end of the inertial scroll display of the content and non-displays the return mark from the screen and further deletes the prior display position of content from the storage unit.

2. The display device according to claim 1, wherein when the touch gesture on the return mark is detected through the touch panel before the scroll display is ended and then the scroll display is ended, the control section non-displays the return mark from the screen and deletes the prior display position from the storage unit.

3. The display device according to claim 1, wherein when a touch gesture is detected through the touch panel on a content displaying portion different from a portion where the return mark is displayed on the screen, the control section stops the scroll display and, when, under this state, a swipe gesture on the return mark is detected through the touch panel, allows the display unit to redisplay on the screen the content of the prior display position.

4. The display device according to claim 1, wherein upon detecting, through the touch panel, that the touch gesture on the return mark is being continued for a predetermined period and then detecting that the touch gesture is ended, the control section allows the display unit to redisplay on the screen the content of the prior display position, even before the scroll display has come to the end.

5. The display device according to claim 1, wherein the control section allows the display unit to display the return mark at an un-overlapping position with the content displayed on the screen, the un-overlapping position being at least one of positions on both sides of the screen.

6. The display device according to claim 1, wherein the control section allows the display unit to translucently display the return mark at an overlapping position with the content displayed on the screen so that the content can be visually recognized.

7. A computer-readable non-transitory recording medium with a display control program recorded thereon, the display control program allowing a computer including a processor to function, when the processor executes the display control program, as a control section that allows a display unit to display content on a screen thereof and, when a touch panel disposed at the screen of the display unit detects a scroll gesture, allows the display unit to perform, on the screen, an inertial scroll display of the content, wherein the display control program further causes the computer to function so that the control section:

allows the storage unit to store a prior display position of the content being displayed on the screen of the display unit at a start time point when a user provides a scroll gesture to the inertial scroll display, and causes the display unit to display, on a predetermined position at the screen, a return mark through which a return function to the prior display position is provided to be operated by a user touch gesture;

when a user touch gesture on the return mark is detected through the touch panel before the inertial scroll display of content has ended, the control section reads out the prior display position from the storage unit and allows the display unit to redisplay on the screen the content of the prior display position after the inertial scroll display of the content has ended; and when the inertial scroll display is ended without the user touch gesture on the return mark being detected through the touch panel, the control section maintains a display state of the content being displayed on the screen of the display unit at the end of the inertial scroll display of the content and non-displays the return mark from the screen and further deletes the prior display position of content from the storage unit.

\* \* \* \* \*